United States Patent [19]
Kim

[11] Patent Number: 5,999,534
[45] Date of Patent: Dec. 7, 1999

[54] METHOD AND APPARATUS FOR SCHEDULING CELLS FOR USE IN A STATIC PRIORITY SCHEDULER

[75] Inventor: Deog-Nyoun Kim, Seoul, Rep. of Korea

[73] Assignee: Daewoo Electronics Co., Ltd., Rep. of Korea

[21] Appl. No.: 08/976,728

[22] Filed: Nov. 24, 1997

[30] Foreign Application Priority Data

Dec. 26, 1996 [KR] Rep. of Korea ................. 96-72056
Dec. 26, 1996 [KR] Rep. of Korea ................. 96-72057

[51] Int. Cl.[6] .................. H04L 12/28; H04L 12/56
[52] U.S. Cl. .................. 370/395; 370/412; 370/444
[58] Field of Search .................. 370/395, 399, 370/409, 389; 0/415, 420, 422, 428, 429, 444, 455, 516, 517, 519, 230, 235, 360, 412, 413, 417, 229, 231, 232, 233, 234, 253, 378, 383

[56] References Cited

U.S. PATENT DOCUMENTS 5,267,235 11/1993 Thacker .................. 370/395
5,563,884 10/1996 Fimoff .................. 370/395
5,592,476 1/1997 Calamvokis et al. .................. 370/395

FOREIGN PATENT DOCUMENTS 0710046 5/1996 European Pat. Off. .
2305576 4/1997 United Kingdom .
9108628 6/1991 WIPO .

*Primary Examiner*—Dang Ton
*Assistant Examiner*—Phirin Sam
*Attorney, Agent, or Firm*—Anderson, Kill & Olick

[57] ABSTRACT

A method for scheduling a plurality of cells of N number of prioritized queues in a node of an ATM network is provided, wherein each prioritized queue has a static priority different from priorities of other queues. In response to receipt of a cell having a jth static priority, the cell is held for a holding time so that the cell turns to be an eligible cell for transmission. Meanwhile, an empty flag $EF_j$ '0' or '1' is generated on a time slot basis, wherein the empty flag $EF_j$ '0' or '1' represents whether or not there exists the eligible cell for transmission in the corresponding jth prioritized queue; and the jth prioritized queue is switched to a higher prioritized switch in a jth prioritized switch based on the empty flag $EF_j$, wherein the jth prioritized switch has a jth and a lower input terminals, which are connected to the jth prioritized queue and the lower prioritized switch, respectively, and an output terminal, which is connected to the higher prioritized switch.

7 Claims, 5 Drawing Sheets

METHOD AND APPARATUS FOR SCHEDULING CELLS FOR USE IN A STATIC PRIORITY SCHEDULER

FIELD OF THE INVENTION

The present invention relates to a method and apparatus for scheduling cells with real-time services in an ATM network; and, more particularly, to a method and apparatus capable of scheduling cells for use in a static priority scheduler with variable number of prioritized queues.

DESCRIPTION OF THE PRIOR ART

B-ISDN(broadband integrated service digital network) is a digital network which provides various kinds of services, such as continuous real-time services and congregative data services by connecting concentrated or distributed users with servers based on a broadband transmission and switching technique. For B-ISDN, an ATM(asynchronous transfer mode) technique is adopted to transmit information across a user-network interface, wherein the ATM technique is a packet-based asynchronous time-division multiplexing technique that takes advantage of both conventional circuit-switching and packet-switching together and is capable of processing various services.

A future ATM network will require unpredictably tremendous services which may have much different traffic characteristics quantitatively as well as qualitatively from those of the current services. The services will be required to guarantee throughput, delay, jitter, and loss rate; and as the real-time services, such as voice or video, will become major services of broadband networks, the requirements on the delay and jitter in the services will become more stringent too. Since real-time information is considered as lost if it is not transferred within a time limit, it becomes more and more important to effectively satisfy the requirements on the delay and jitter.

A number of works have been reported on the queuing strategy which can support real-time communication services in high-speed packet switched networks. They can be classified into a work-conserving and a non-work-conserving strategies. In the network with the work-conserving service disciplines, network load fluctuation at previous nodes may distort the traffic pattern of a connection and cause an instantaneous rate increase at some nodes even when the connection satisfies the user-specified rate constraint at the entrance to the network. The burstiness of traffic in a connection usually accumulates at each hop along a connection path from a source node to a destination node, thereby requiring more resources for downstream nodes.

In order to address this problem, several non-work-conserving packet service disciplines that can possibly regulate the packet jitter at intermediate nodes to prevent the traffic becoming burstier have been proposed. A hierarchical round robin (HRR) and a stop-and-go (SG) technique are the typical examples thereof which divide the time axis into frames of a constant length and allocate a certain number of segmented frames to each connection. In this framing strategy, packet service is allowed only for the allocated time frame and thus can possibly bound the delay jitter. However, it has an intrinsic coupling problem between bandwidth granularity and delay bounds which may lead to low bandwidth utilization. A jitter earliest-due-date (jitter-EDD) and a rate-controlled static priority (RCSP) techniques control the packet jitter on a per packet basis, but require to compute the leading time of each packet in each node and to stamp it on the header for transmission to the next node.

Referring to FIG. 1, there is illustrated an apparatus for implementing a conventional static priority discipline, e.g., a rate-controlled static priority (RCSP) discipline, which shows the progress of cells k's of a multiplicity of prioritized connections j's at a switching node i, wherein the node number i, the prioritized connection number j and the cell number k are positive integers, respectively.

The apparatus has two components: a rate controller 10 and a static priority scheduler 20, which are responsible for allocating bandwidths and delays to different prioritized connections, respectively. The combination of the rate controller 10 and the static prioritized scheduler 20 decouples the allocation of bandwidth from delay and simplifies admission control and implementation.

The rate controller 10 shapes the input traffic from each connection into a desired traffic pattern by assigning an eligibility time to each cell. Conceptually, the rate controller 10 includes a set of N regulators 10-1 to 10-N corresponding to the connections traversing a switching node, N being a positive integer; and each of the first to Nth regulators 10-1 to 10-N is responsible for shaping the input traffic of a prioritized connection corresponding to one priority among N number of priorities into the desired traffic pattern. In other words, the rate controller 10 has N number of priority levels with each priority level corresponding to a delay bound during connection establishment time, wherein a smaller delay bound corresponds to a higher priority level, i.e, a lower priority number. Upon arrival of a real-time cell, the real-time cell is provided to a corresponding regulator 10-j via a corresponding virtual channel $VC_j$ among N virtual channels $VC_1$ to $VC_N$ based on information in the header of the cell; and an eligible time for the cell is calculated to be assigned to the cell in each of the regulators 10-1 to 10-N. In other words, a cell fed from the regulator 10-j on said each connection j can be assigned to any priority level in the static prioritized scheduler 20, so that there is a one-to-one correspondence between the regulator and the priority level. The cell is held in said each of the regulators 10-1 to 10-N till its eligible time before being handed to the scheduler for transmission and, then, is provided as a regulated cell $R_j$ to each corresponding prioritized queue among prioritized queues 21-1 to 21-N of the static prioritized scheduler 20, j being a positive integer equal to or less than N.

Meanwhile, the static prioritized scheduler 20 orders the transmission of eligible cells from all the connections j's. The static prioritized scheduler 20 in RCSP includes N number of prioritized queues 21-1 to 21-N, a non real-time queue 22, a highest non-empty queue detector 23 and a multiplexor 24, wherein a jth prioritized queue 21-j represents a real-time queue having jth priority among N priorities. All cells from said each connection j will be inserted into the real-time queue at a priority level corresponding to said each connection j. The static prioritized scheduler 20 in RCSP uses a non-preemptive static priority discipline: it always selects a packet, in first-in first-out(FIFO) order, at the head of highest priority queue that is not empty.

The jth prioritized queue 21-j provides an empty flag $EF_j$ of value either '0' or '1' to the highest non-empty queue detector 23, wherein a value "0" of the empty flag $EF_j$ represents that there exists an eligible cell for transmission in the jth prioritized queue 21-j and a value "1" thereof represents that there exists none. If there exists an eligible cell for transmission in the jth prioritized queue 21-j, the eligible cell is provided to the multiplexor(MUX) 24. At the highest non-empty queue detector 23, all empty flags $EF_j$'s fed from all the first to the Nth prioritized queues are compared with each other to find out a highest prioritized queue among prioritized queues that have an eligible cell, respectively, and a highest non-empty signal representing the highest prioritized queue is issued to the multiplexor 24. In response to the highest non-empty signal, the multiplexor 24 provides an eligible cell in the highest prioritized queue to a transmitter(not drawn).

At the non real-time queue 22, a non real-time cell fed via a virtual channel $VC_0$ will be serviced only when all prioritized queues 21-1 to 21-N are empty, i.e., all empty flags $EF_j$'s are '1'.

Therefore, in order to compare all the empty flags, the conventional static priority queuing discipline requires a circuit, e.g., a highest non-empty queue detector, connected to all the prioritized queues. Moreover, since the length of time needed to compare all the empty flags is proportional to the number of prioritized queues, the conventional static priority queuing discipline is hardly admissible in the real-time ATM network which transmits a number of cells from a variable number of prioritized queues with different traffic characteristics in a short time.

SUMMARY OF THE INVENTION

It is, therefore, a primary object of the invention to provide a method and apparatus capable of scheduling cells by a decentralized control mechanism within a limited constant time without employing a comparing circuit to compare all the empty flags for use in a static priority scheduler of a real-time ATM network with variable number of prioritized queues.

In accordance with the present invention, there is provided a method for scheduling a plurality of cells of N number of prioritized queues in a node of an ATM network, N being a positive integer, wherein each prioritized queue has a static priority different from priorities of other queues, the method comprising the steps of:

(a) in response to a cell having a jth static priority, calculating a holding time after which the cell will be eligible for transmission, wherein the static prioritized number j is a positive integer less than or equal to N and a smaller static prioritized number has a higher priority;

(b) holding the cell for the holding time so that the cell becomes eligible for transmission;

(c) generating an empty flag $EF_j$ of a value either '0' or '1' on a time slot basis, wherein the empty flag $EF_j$ of a value '0' represents that there exists an eligible cell for transmission in the corresponding jth prioritized queue while that of a value '1' indicates that there is none eligible;

(d) switching the jth prioritized queue to a higher prioritized switch in a jth prioritized switch based on the empty flag $EF_j$, wherein the jth prioritized switch has two input terminals, a jth one and a lower one, which are connected to the jth prioritized queue and a lower prioritized switch, respectively, and an output terminal, which is connected to the higher prioritized switch; and the output terminal of the first prioritized switch is attached to a transmitter for transmission and the lower input terminal of the Nth prioritized switch is attached to a non real-time queue which has non-prioritized cells; and (e) transmitting the eligible cell attached to the transmitter to a destined next node on a time slot basis.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
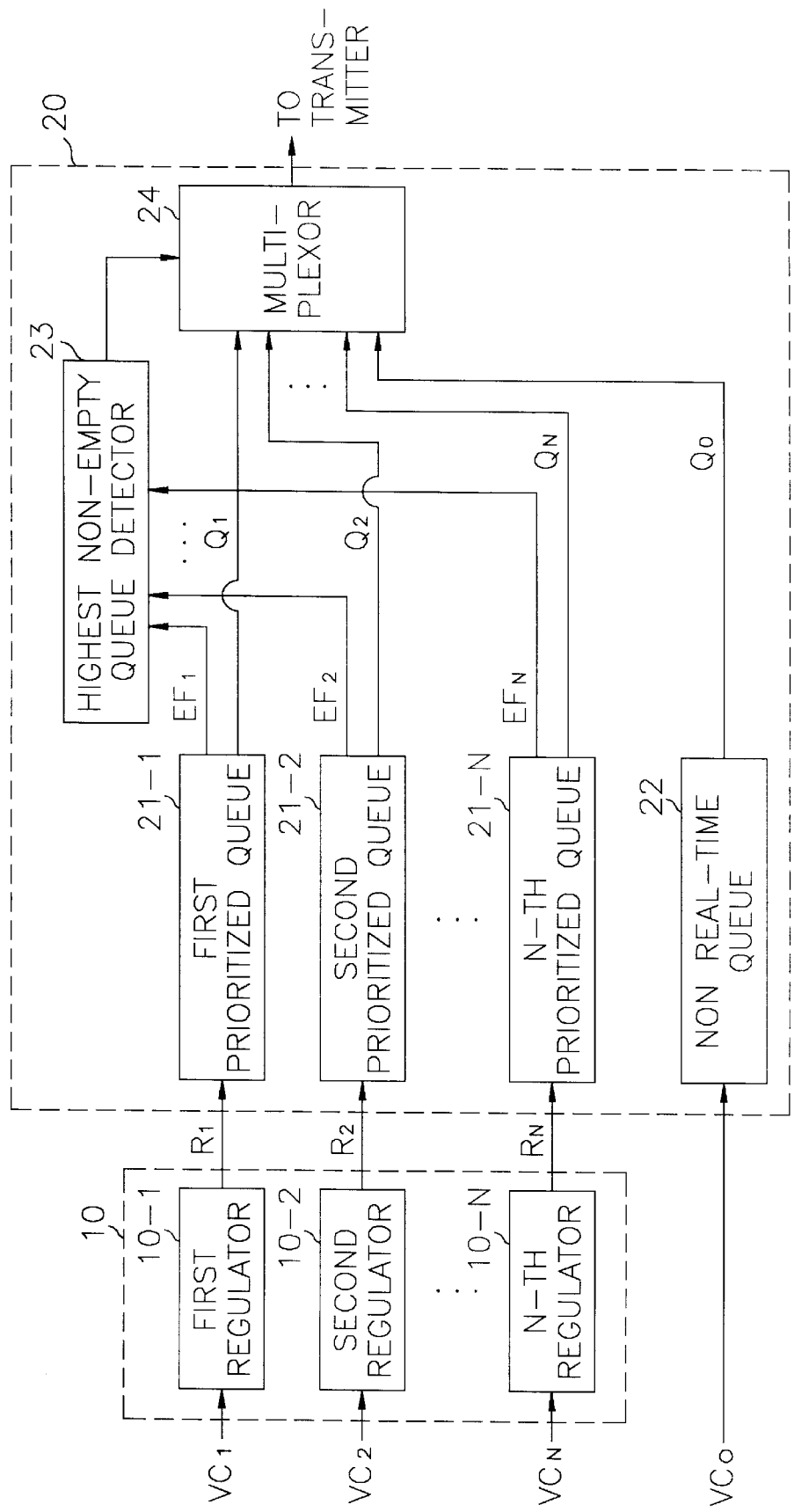
FIG. 1 illustrates a conventional rate-controlled static priority (RCSP) discipline.
Figure 2:
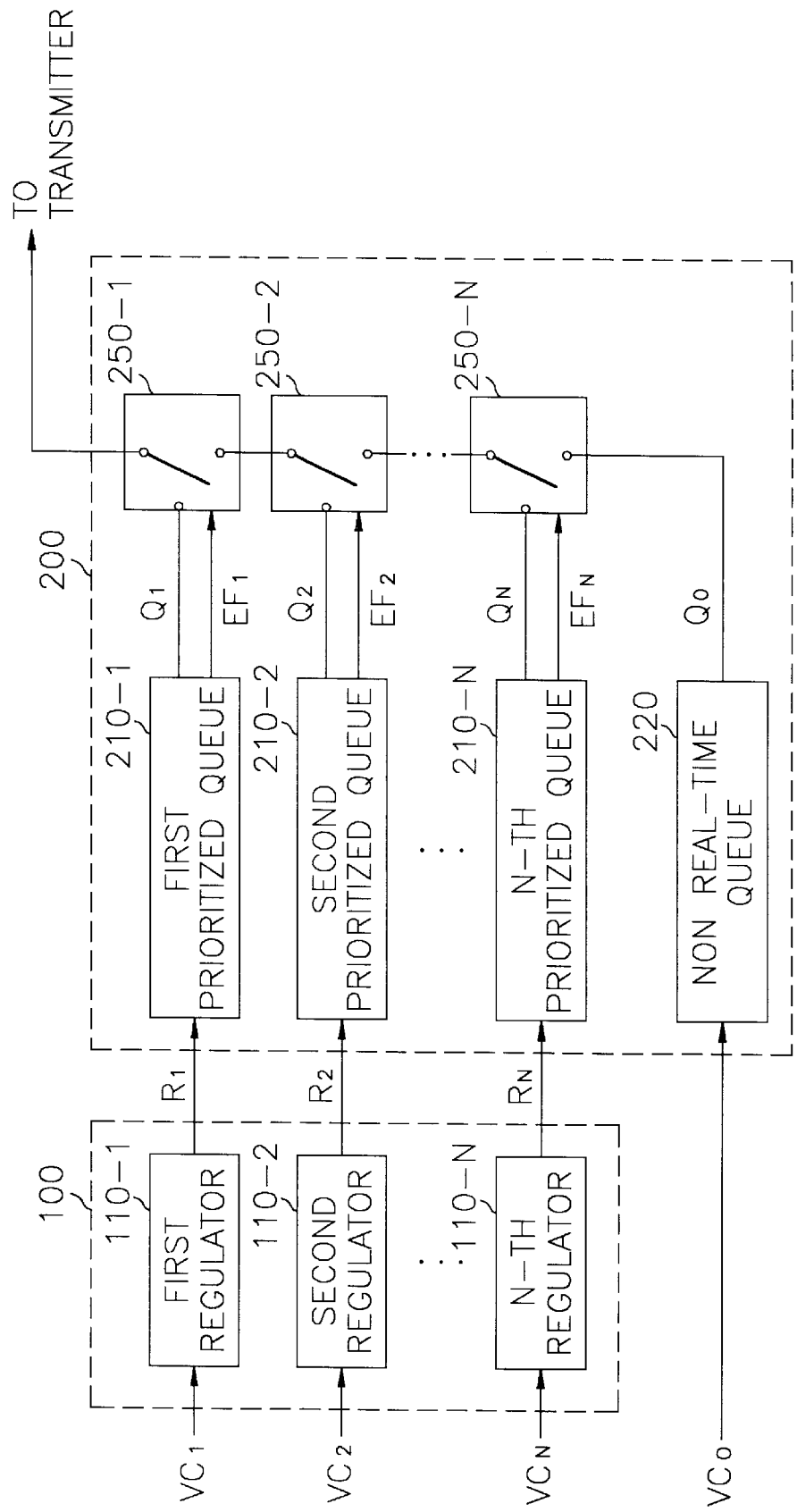
FIG. 2 shows a block diagram of an apparatus for regulating and scheduling cells by a decentralized control mechanism for N+1 number of prioritized connections in accordance with the present invention.

Referring to FIG. 2, there is illustrated a block diagram of an apparatus for regulating and scheduling cells by a decentralized control mechanism for N+1 number of connections in accordance with the present invention, N being a positive integer. It is assumed that there are N prioritized virtual channels $VC_1$ to $VC_N$ for real-time traffics and one virtual channel $VC_0$ for delay insensitive traffic, i.e., non real-time traffic, which shows a progress of cells of a multiplicity of prioritized connections j's at a switching node i, wherein the node number i and the prioritized connection number j are positive integers, respectively.

The apparatus in accordance with the present invention has also two components similar to the conventional apparatus: a rate controller 100 and a static priority scheduler 200. A conventional rate controller may be employed for the rate controller 100 of the present invention without any change, so that the rate controller 100 includes a set of regulators 110-1 to 110-N corresponding to the prioritized connections traversing a switching node. In other words, the rate controller 100 has N number of priority levels with each priority level corresponding to a delay bound during connection establishment time, wherein a smaller delay bound corresponds to a higher priority level, i.e, a smaller priority number. If a real-time cell is provided to a corresponding regulator 110-j from a virtual channel $VC_j$ with a prioritized connection j based on information of the header of the cell, an eligible time for the real-time cell is calculated to be assigned to the real-time cell in the corresponding regulator 110-j. The real-time cell is held in the regulator 110-j till its eligible time before being transferred to the static priority scheduler 200 for transmission thereof and, then, is provided as a corresponding regulated cell $R_j$ to a jth prioritized queue among N prioritized queues 210-1 to 210-N of the static prioritized scheduler 200, j being equal to or less than N. Different ways of calculating the eligible time of a cell will result in different requirements on types of regulators.

Meanwhile, the static prioritized scheduler 200 includes N number of prioritized queues 210-1 to 210-N and a non real-time queue 220, wherein a jth prioritized queue 210-j represents a jth real-time queue for a jth prioritized connection having a jth priority among N priorities. All cells from each connection j will be inserted into the jth prioritized real-time queue at a priority level corresponding to said each connection j. The static prioritized scheduler 200 always selects a cell, in first-in first-out(FIFO) order, at the head of highest priority queue that is not empty. First of all, each jth prioritized queue 210-j provides an empty flag $EF_j$ of a value either '0' or '1' to a jth prioritized switch 250-j, wherein a value "0" of the empty flag $EF_j$ represents that there exists an eligible cell for transmission in the jth prioritized queue 210-j and a value "1" thereof indicates that there exists none. If there exists an eligible cell for transmission in the jth prioritized queue 210-j, the eligible cell is provided to an input of the jth prioritized switch 250-j.

The jth prioritized switch 250-j connects an output terminal to one of two input terminals in response to the jth empty flag $EF_j$, wherein one of two input terminals of the jth prioritized switch 250-j is connected to an output of the current prioritized queue, i.e. the jth prioritized queue 210-j being referred to as a current, i.e., jth input terminal; the other input terminal of the jth prioritized switch 250-j is connected to an output terminal of a lower prioritized switch 250-(j+1) of a lower prioritized connection (j+1) being referred to as a lower input terminal; and the output terminal of the jth prioritized switch 250-j is connected to a lower input terminal of a higher prioritized switch 250-(j−1) of a higher prioritized connection (j−1). Especially, the output terminal of a first prioritized switch 250-1 is preferably connected to a transmitter (not drawn) and the lower input terminal of a last, i.e., Nth prioritized switch 250-N is preferably connected to an output of a non real time queue 220.

Figure 3A:
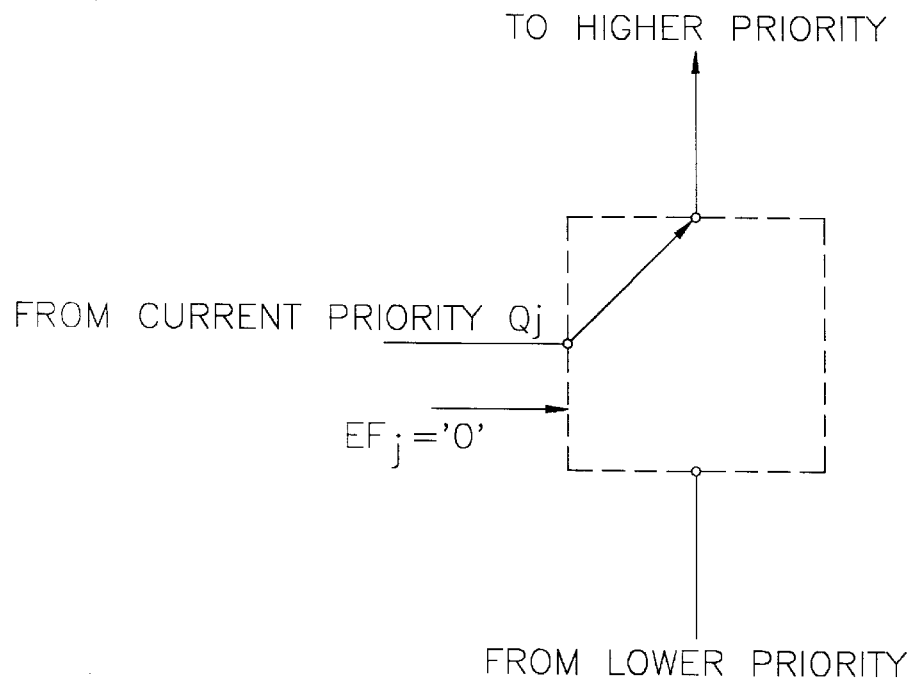
FIGS. 3A and 3B show an operation principle of a jth prioritized switch based on an empty flag in FIG. 2.
Figure 3B:
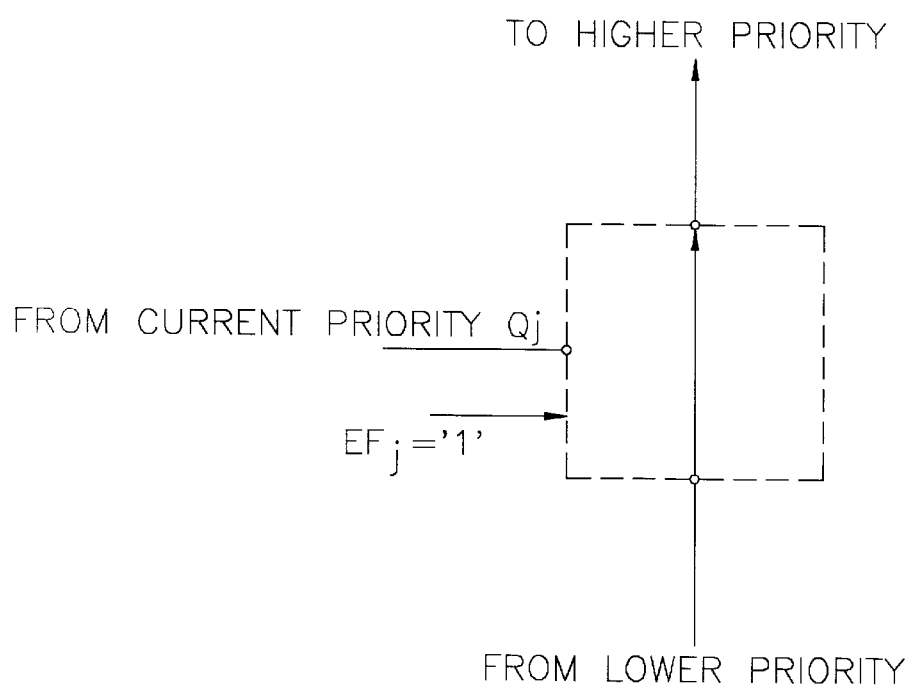

Referring to FIGS. 3A and 3B, there is illustrated an operation principle of a current prioritized switch shown in FIG. 2 based on an empty flag of a value either '0' or '1'. If the empty flag $EF_j$ of the current prioritized connection j is '0', FIG. 3A shows that, in the current prioritized switch drawn in a dotted line, the output terminal attached to the higher prioritized switch is coupled with the current input terminal attached to the current prioritized queue $Q_j$, so that an eligible cell in the current prioritized queue is transmitted to the higher prioritized switch. On the contrary, if the empty flag $EF_j$ of the current prioritized connection j is '1', FIG. 3B shows that the output terminal is coupled with the lower input terminal attached to the lower prioritized switch, so that a cell provided from the lower prioritized switch is transmitted to the higher prioritized switch.

Figure 4A:
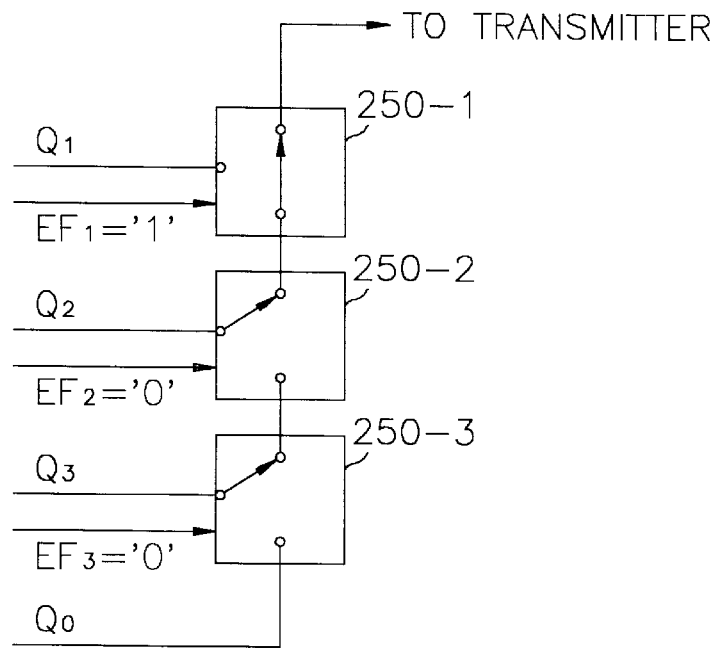
FIGS. 4A and 4B represent connection states of 3 number of prioritized switches with 2 set of empty flags '1', '0', '0' and '1', '1', '1', respectively.
Figure 4B:
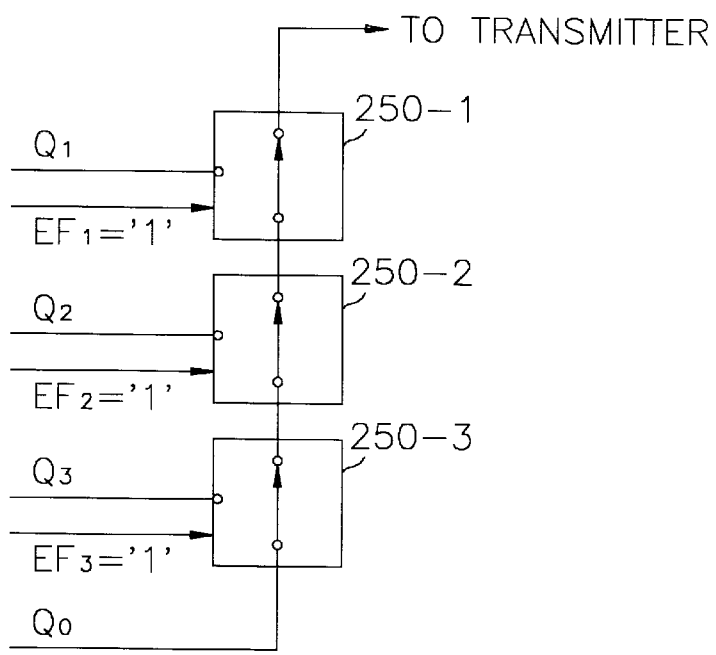

Referring to FIGS. 4A and 4B, there are represented exemplary connection states of 3 number of prioritized switches based on the empty flags $EF_j$'s. It is assumed that each of 3 prioritized queues $Q_1$ to $Q_3$ are inputted to a corresponding prioritized switch as the corresponding current prioritized input. If 3 empty flags $EF_j$'s of values '1', '0' and '0', respectively, are fed from the 3 prioritized queues $Q_1$ to $Q_3$, respectively, in FIG. 4A, the highest prioritized queue, i.e., the first prioritized queue $Q_1$ has no eligible cell so that an eligible cell of the second prioritized queue $Q_2$ is provided to the transmitter through the first prioritized switch 250-1. Referring to FIG. 4B, if 3 prioritized queues $Q_1$ to $Q_3$ generate 3 empty flags $EF_j$'s of values '1', '1' and '1', respectively, there is no eligible cell for transmission so that a non real-time cell of a non real-time queue $Q_0$ is provided to the transmitter through all the 3 prioritized switches 250-1 to 250-3.

Figure 5:
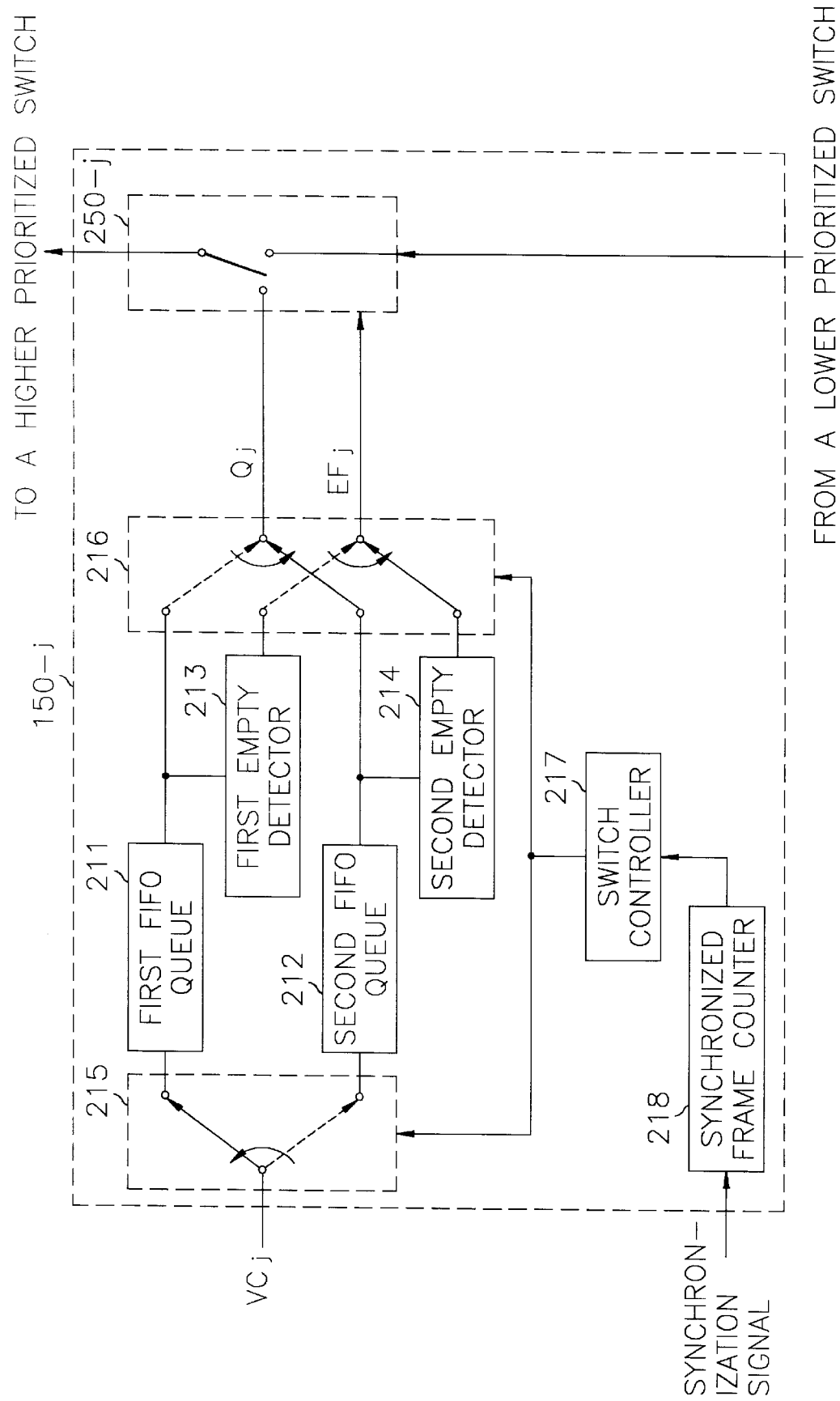
FIG. 5 presents an exemplary block diagram of a regulator and scheduler for jth prioritized queue.

Referring to FIG. 5, there is illustrated an exemplary block diagram of a regulator and scheduler 150-j for a jth prioritized queue, wherein the regulator and scheduler 150-j performs the function of a combination of a jth regulator 110-j, a jth prioritized queue 210-j and a jth prioritized switch 250-j shown in FIG. 2. The regulator and scheduler 150-j for jth prioritized queue includes a first and a second FIFO(first input first out) queues 211 and 212, a first and a second empty detectors 213 and 214, an input and an output toggle switches 215 and 216, a switch controller 217, a synchronized frame counter 218 and a jth prioritized switch 250-j.

First of all, the synchronized frame counter 218 for the jth prioritized connection is pre-synchronized by a synchronization signal, wherein the synchronization signal takes account of a propagation delay $\tau_i$ between two neighboring nodes i and i+1, a delay bound $d_{ij}$ at each node i of the jth prioritized connection and the frame size $T_j$ of the jth prioritized connection; and each count of the frame counter 218 is decreased by one at each time slot, or each service time, and is reset to the frame size $T_j$ of the jth prioritized connection as soon as the count becomes '0'. When said each count is reset to a frame size $T_j$, the switch controller 217 generates a switching signal with a period of the frame size $T_j$ to provide it to the input and the output switches 215 and 216.

Meanwhile, at the input switch 215, a virtual channel $VC_j$ of the jth prioritized connection is alternately coupled to the first and the second FIFO(first-in first-out) queues 211 and 212 in response to the switching signal fed from the switch controller 217. Further, at the output switch 216, if an input of the first FIFO queue 211 is connected to the virtual channel $VC_j$ as shown in a solid arrow in FIG. 5 in response to the switching signal, then an output of the second FIFO queue 212 is connected to a current input of the jth prioritized switch 250-j so that an eligible cell in the second FIFO queue 212 is provided as the jth prioritized queue $Q_j$ to the jth prioritized switch 250-j. On the other hand, if an input of the second FIFO queue 212 is connected to the virtual channel $VC_j$ as shown in a dotted arrow in FIG. 5, then an output of the first FIFO queue 211 is connected to the current input of the jth prioritized switch 250-j so that an eligible cell in the first FIFO queue 211 is provided as the jth prioritized queue $Q_j$ to the jth prioritized switch 250-j. In other words, the first and the second FIFO queues 211 and 212 are logically separated from each other so that one FIFO queue will function as the jth prioritized queue by storing an eligible cell ready to be scheduled for transmission while the other FIFO queue will function as the jth regulator by storing a cell that won't be eligible.

Outputs of the first and the second FIFO queues 211 and 212 are also connected to the first and the second empty detectors 213 and 214, respectively, so that the first and the second empty detectors 213 and 214 detect whether or not the first and the second FIFO queues 211 and 212 are empty, i.e., whether or not there exists a cell for transmission in the first and the second FIFO queues 211 and 212, respectively. If a cell has already been transmitted by a scheduling discipline or if no cell has been inputted to the corresponding FIFO queue to be rate-controlled, then an empty flag $EF_j$ of value '1' is provided to the jth prioritized switch 250-j and, if there exists an eligible cell for transmitting in the corresponding FIFO queue, then an empty flag $EF_j$ of value '0' is provided. Needless to say, in the output switch 216, if the first FIFO queue 211 is coupled with the jth prioritized switch 250-j, then the empty flag $EF_j$ of the first empty detector 213 may function as a shifting signal of the jth prioritized switch 250-j; and, if the second FIFO queue 212 is coupled with the jth prioritized switch 250-j, then the empty flag $EF_j$ of the second empty detector 214 may function as a shifting signal of the jth prioritized switch 250-j.

While the present invention has been described with respect to certain preferred embodiments only, other modifications and variations may be made without departing from the spirit and scope of the present invention as set forth in the following claims.

What is claimed is:

1. A method for scheduling a plurality of cells of N number of prioritized queues in a node of an ATM network, N being a positive integer, wherein each prioritized queue has a static priority different from priorities of other queues, the method comprising the steps of:

(a) in response to a cell having a jth static priority, calculating a holding time after which the cell will be eligible for transmission, wherein the static prioritized number j is a positive integer less than or equal to N and a smaller static prioritized number has a higher priority;

(b) holding the cell for the holding time so that the cell becomes eligible for transmission;

(c) generating an empty flag $EF_j$ of a value either '0' or '1' on a time slot basis, wherein the empty flag $EF_j$ of a value '0' represents that there exists an eligible cell for transmission in a corresponding jth prioritized queue while that of a value '1' indicates that there is none eligible;

(d) switching a jth prioritized queue to a higher prioritized switch in a jth prioritized switch based on the empty flag $EF_j$, wherein the jth prioritized switch has two input terminals, a jth one and a lower one, which are connected to the jth prioritized queue and a lower prioritized switch, respectively, and an output terminal, which is connected to the higher prioritized switch; and the output terminal of a first prioritized switch is attached to a transmitter for transmission and the lower input terminal of an Nth prioritized switch is attached to a non real-time queue which has non-prioritized cells; and (e) transmitting the eligible cell attached to the transmitter to a destined next node on a time slot basis.

2. The method as recited in claim 1, wherein, if the empty flag $EF_j$ is of a value '0', the jth prioritized queue is coupled with a higher prioritized switch and, if the empty flag $EF_j$ is of a value '1', the lower prioritized switch is coupled with the higher prioritized switch.

3. The method as recited in claim 2, wherein the higher static priority has a smaller delay bound.

4. An apparatus for scheduling a plurality of cells of N number of prioritized queues in ATM network, N being a positive integer, wherein each prioritized queue has a static priority different from priorities of other queues, the apparatus comprises:

means, in response to a cell having a jth static priority, for calculating a holding time after which the cell will be eligible for transmission, wherein the static prioritized number j is a positive integer less than or equal to N and a smaller static prioritized number has a higher priority;

means for holding the cell for the holding time so that the cell becomes eligible for transmission;

means for signaling time slots, wherein at most one eligible cell per time slot is transmitted;

means for generating an empty flag $EF_j$ of a value either '0' or '1' on a time slot basis, wherein the empty flag $EF_j$ of a value '0' represents that there exists an eligible cell for transmission in a corresponding jth prioritized queue while that of a value '1' indicates that there is none eligible;

N prioritized switches, jth prioritized switch for switching a jth prioritized queue to an adjacent higher prioritized switch based on the empty flag $EF_j$, j having values from 1 to N, wherein the jth prioritized switch has two input terminals, a jth one and a lower one, which are connected to the jth prioritized queue and a lower prioritized switch, respectively, and an output terminal, which is connected to the higher prioritized switch; and the output terminal of a first prioritized switch is attached to a transmitter for transmission and the lower input terminal of an Nth prioritized switch is attached to a non real-time queue which has non-prioritized cells; and means for transmitting the eligible cell attached to the transmitter to a destined next node on a time slot basis.

5. The apparatus as recited in claim 4, wherein the holding means includes two FIFO(first-in first-out) queues logically separated from each other so that one FIFO queue stores an eligible cell ready to be scheduled for transmission while the other FIFO queue stores a non-eligible cell for the holding time.

6. The apparatus as recited in claim 5, wherein, if the empty flag $EF_j$ is of a value '0', the jth prioritized queue is coupled with the higher prioritized switch and, if the empty flag $EF_j$ is of a value '1', a lower prioritized switch is coupled with the higher prioritized switch.

7. The apparatus as recited in claim 6, wherein the higher static priority has a smaller delay bound.

* * * * *